United States Patent Office 3,183,152
Patented May 11, 1965

3,183,152
TREATED POLYVINYL ALCOHOL FOR CONTACT LENS SOLUTION
Ivan J. Szekely and Harry W. Hind, Sunnyvale, Calif., assignors to Barnes-Hind Pharmaceuticals, Inc., a corporation of California
No Drawing. Filed May 21, 1963, Ser. No. 282,103
12 Claims. (Cl. 167—59)

This application is a continuation-in-part of our application Serial No. 81,282, filed January 9, 1961.

This invention relates to a solution for use with contact lenses.

Contact lenses are becoming increasingly popular, but such lenses do present some problems with respect to wearer comfort. Such lenses are commonly made of methylmethacrylate resin and patients frequently complain of fogging of the lenses and irritation with prolonged wearing. Such complaints may arise immediately after the lenses are put on or after several hours of continuous wearing. Mere mechanical adjustments of the lenses do not provide a complete solution. Assuming that the lenses are properly fitted, such difficulties arise primarily because of inadequate hydration during storage of the lenses and incomplete wetting of the lenses by the lachrymatory fluid. Unfortunately, methylmethacrylate is a hydrophobic solid and unless some special precautions are taken to render the plastic hydrophilic, the tears will not wet the lens and unless the lenses are wet, they will be uncomfortable and cloudy.

If one attempts to solve this problem by using conventional surface-active agents, the results are generally unsatisfactory and, in fact, the result may acually be worse than no treatment of the lens. The reason for this is that many conventional surface-active agents orient themselves on methylmethacrylate so that the hydrophilic portion of the molecule is attached to the plastic, and the hydrophobic portions form a new surface which is, of course, hydrophobic. In this way, conventional wetting agents may actually cause the lens to become more hydrophobic than the untreated plastic. Further disadvantages are that such agents are frequently irritants as well as sensitizers and therefore cannot be placed in the human eye. A still further disadvantage is that such surface-active agents, even if properly oriented, are usually only very weakly adherent to the surface of the lens and thus do not have a lasting effect.

The essential characteristics of an ideal wetting solution can be summarized as follows:

(1) It should wet thoroughly and spread over the entire surface of the lens;

(2) It should form a film which is sufficiently tenacious so that it will not be washed away during the wearing period by the tears;

(3) It should be so formulated that it can be instilled directly into the eye, i.e., it should be non-irritating and non-sensitizing;

(4) It should be compounded so that it will not leave a residue of film on the lenses or on the skin around the eyes after mounting on drying;

(5) It should have a cleansing and antiseptic action and should be self-preserving;

(6) It should not interfere with immersion wetting by the lachrymal fluid;

(7) It should have the proper degree of viscosity for efficient lubrication.

In accordance with the present invention, a contact lens solution is made which has all of the above desirable attributes which contains as an active ingredient a modified polyvinyl alcohol. It has been found that the polyvinyl alcohols of commerce contain irritating substances and are unsuited for use in contact lens solutions until treated. Further, it has been found that the degree of hydrolysis of the polyvinyl alcohol is important and that polyvinyl alcohol solutions containing from 1 to 20% and preferably about 11 or 12% of polyvinyl acetate are most effective. We have found that particularly good results are had with the polyvinyl alcohol sold under the trade name of Elvanol 5105, manufactured by E. I. du Pont de Nemours and Co. This particular grade of polyvinyl alcohol is from 88% to 90% hydrolyzed and has a volatile content of up to 5% (which is removed as is hereinafter described). A 4% solution of this material in water has a viscosity of 5 cps. Although this is a preferred material, other polyvinyl alcohols of commerce, such as Elvanol 7260 or hte various trades of Gelvatol, manufactured by Shawinigan Products Corporation, may be employed. It has been found that polyvinyl alcohol containing from 1 to 2% of polyvinyl acetate and free of volatile materials has remarkable wetting properties and yet is not irritating to the eyes. Other agents which have similar wetting properties are eye-irritating and would be entirely unsuited for use in a contact lens solution.

Polyvinyl alcohol is modified either by boiling it or by treating it under a vacuum until volatile material is removed therefrom. The volatile material will ordinarily constitute from 1% to 2% of the polyvinyl alcohol and it is preferred that all material which is volatile at a temperature of 100° C. be removed.

In addition to the modified polyvinyl alcohol described above, the contact lens solution must contain a salt to make it isotonic. Ordinary sodium chloride is quite suited for this purpose, although other salts as are well known to those skilled in the art of preparing isotonic solutions may be employed, such as sodium sulfate and potassium chloride.

The solution must also contain an agent to adjust its viscosity. The viscosity-adjusting agent must be non-ionic in character and must be used in sufficient quantity so that the finger will not actually contact the lens when the lens is being inserted. An non-ionic thickening agent may be used, such as hydroxy ethyl cellulose, gelatin polyvinylpyrrolidone and water soluble starch derivatives. Of these, hydroxy ethyl cellulose is best suited for this purpose since it possesses a number of advantages over other thickening agents, including:

(1) It is compatible with quaternary ammonium chloride compounds used as preservatives (most other gums are not).

(2) It is not affected by pH and salt concentration (most other gums are and precipitate).

(3) Not subject to microbial degradation which is very important for sterile products.

(4) Readily dispersible in cold water.

(5) No foaming in manufacturing.

(6) Does not precipitate at autoclaving temperature.

(7) No viscosity changes after several heating cycles.

(8) Considerably more stable (practically no hydrolysis).

The grades of hydroxy ethyl cellulose sold as WP-4400, manufactured by Carbide & Carbon Chemicals Corporation, and that sold as Natrosol-250 (medium viscosity) by Hercules Powder Company, have been found to be particularly suitable. The viscosity of the wetting solution is adjusted from 30 to 60 or even 100 cps. utilizing the thickening agent. It has been found that if the viscosity is under 30 cps., there is insufficient mechanical strength to prevent the lens from contacting the finger, while if the viscosity is over 100 cps., there will be a tendency of the eyelids to stick together. A viscosity of 60 cps. is considered ideal.

It is important that the polyvinyl alcohol chosen be of a grade which has little reactivity with borate or phosphate ions, since it is common practice for opthalmologists to flush out the eyes with solutions containing borate or phosphate ions. Thus, solutions which are 88 to 89% hydrolyzed, i.e. contain 11 or 12% polyvinyl acetate, have substantially no reaction with borate or phosphate ions, while a more completely hydrolyzed polyvinyl alcohol forms a precipitate.

A typical solution which may be formed in accordance with the present invention is as follows (all parts by weight, balance pure water):

2% modified polyvinyl alcohol
    0.8% sodium chloride
    0.004% benzalkonium chloride
    0.63% hydroxy ethyl cellulose The "modified polyvinyl alcohol" listed above was prepared by mixing two kilograms of Elvanol 5105 polyvinyl alcohol with 5 liters of water in a round-bottom flask and heating the contents to a temperature of 100–105° C. to distill off about 1,000 cc. of water containing volatile components. The residue consisted of about 5,000 cc. and contained 11% polyvinyl acetate; this was sufficient for the preparation of about 100 liters of finished product when incorporated according to the formulation given above.

It will be understood, of course, that substantial deviations can be made from this exact formula without departing from the spirit of this invention. For instance, the amount of polyvinyl alcohol can vary from 0.1 to 6 or even 10% and other preservatives can be used, it being important only that it be physiologically acceptable, and the quantity of germicide can be varied from 0.0001% to 0.02%. Further, the type, amount and grade of the thickening agent can be varied within the range of 0.1 to 4%, it being preferred that the viscosity of the final solution be adjusted to the range 30 to 60 cps. Since the polyvinyl alcohol has some viscosity-increasing properties, the amount of the thickening agent should be correlated with the amount of polyvinyl alcohol, i.e. when larger amounts of polyvinyl alcohol are used the amount of thickening agent should be reduced and vice versa to keep the viscosity within the desired range.

We claim:
1. A wetting solution suitable for use with contact lenses comprising an aqueous solution of polyvinyl alcohol, said polyvinyl alcohol being present in an amount of from 0.1 to 6% by weight and having been modified by the removal of substantially all volatile materials therefrom boiling below about 100° C.

2. The solution of claim 1 wherein the polyvinyl alcohol contains from 1 to 20% of unhydrolyzed polyvinyl acetate.

3. The solution of claim 1 wherein the viscosity of the solution is adjusted to from 30 to 100 cps. with a non-ionic viscosity modifying agent and wherein the said solution is rendered isotonic by the addition of a salt.

4. The solution of claim 1 wherein the viscosity of the solution is adjusted to from 30 to 60 cps. with a non-ionic viscosity modifying agent and wherein the said solution is rendered isotonic by the addition of a salt.

5. The solution of claim 1 containing from 0.1 to 4% of hydroxy ethyl cellulose.

6. A solution for use as a wetting agent for contact lenses comprising the following ingredients:

0.1 to 6% modified polyvinyl alcohol;
    0.8% sodium chloride;
    0.004% benzalkonium chloride; and
    0.63% hydroxy ethyl cellulose, the balance of said solution being water, all parts being by weight, and said modified polyvinyl alcohol being modified by the removal of substantially all volatile ingredients therefrom boiling below about 100° C. and being from 88 to 89% hydrolyzed.

7. The composition of claim 6 wherein the polyvinyl alcohol is present in the amount of 2%.

8. A wetting solution suitable for use with contact lenses comprising an aqueous isotonic solution of polyvinyl alcohol containing about 11% of polyvinyl acetate, said polyvinyl alcohol being present in an amount of from 0.1% to about 6% by weight and being free of substantially all volatile materials boiling below about 100° C.

9. A wetting solution suitable for use with contact lenses and consisting essentially of an aqueous solution of polyvinyl alcohol having a viscosity of from 30 to 60 cps. and containing sufficient of a salt to render the solution isotonic, the polyvinyl alcohol being present in an amount from 0.1% to about 6% by weight and containing about 11–12% hydrolyzed polyvinyl acetate, said alcohol being free of substantially all volatile constituents boiling below about 100° C.

10. A wetting solution suitable for use with contact lenses comprising an aqueous solution of polyvinyl alcohol, said polyvinyl alcohol being present in an amount of from 0.1 to 10% by weight and having been modified by the removal of substantially all volatile materials therefrom boiling below about 100° C.

11. An isotonic solution for use as a wetting agent for contact lenses comprising the following:

0.1 to 10% modified polyvinyl alcohol;
    0.1 to 4% hydroxy ethyl cellulose; and
    0.0001 to 0.02% of a physiologically acceptable germicide, said solution containing sufficient of a salt to render it isotonic, the balance of said solution being water, all parts being by weight, and said modified polyvinyl alcohol being modified by the removal of substantially all volatile ingredients therefrom boiling below about 100° C. and being from 88 to 89% hydrolyzed.

12. A wetting solution suitable for use with contact lenses and consisting essentially of an aqueous solution of polyvinyl alcohol having a viscosity of from 30 to 100 cps. and containing sufficient of a salt to render the solution isotonic, the polyvinyl alcohol being present in an amount from 0.1% to about 6% by weight and containing about 11–12% hydrolyzed polyvinyl acetate, said alcohol being free of substantially all volatile constituents boiling below about 100° C.

References Cited by the Examiner

UNITED STATES PATENTS

| | | | |
|---|---|---|---|
| 2,362,761 | 11/44 | Medl | 167—63 |
| 2,897,120 | 7/59 | Cronin et al. | 167—59 |
| 2,988,480 | 6/61 | Cuckler | 167—63 |

OTHER REFERENCES

Hind et al.: Jour. Am. Pharm. Assoc., Prac. Edition, 11: 12, 1950.

Du Pont Product Index, 1957–58, page 8.

LEWIS GOTTS, *Primary Examiner.*

FRANK CACCIAPAGLIA, JR., *Examiner.*